(12) United States Patent
Fu et al.

(10) Patent No.: US 11,640,666 B2
(45) Date of Patent: May 2, 2023

(54) METHOD FOR MAKING TEXTURE SYMBOL OF LAND USE CLASSIFICATION MAP

(71) Applicant: China University of Geosciences (Beijing), Beijing (CN)

(72) Inventors: Zongtang Fu, Beijing (CN); Yushuang Wang, Beijing (CN); Dong Chen, Beijing (CN)

(73) Assignee: China University of Geosciences (Beijing), Beijing (CN)

( * ) Notice: Subject to any disclaimer, the term of this patent is extended or adjusted under 35 U.S.C. 154(b) by 366 days.

(21) Appl. No.: 17/069,287

(22) Filed: Oct. 13, 2020

(65) Prior Publication Data
US 2021/0109963 A1    Apr. 15, 2021

(30) Foreign Application Priority Data

Oct. 14, 2019  (CN) .......................... 201910974480.4

(51) Int. Cl.
*G06T 7/11* (2017.01)
*G06F 16/55* (2019.01)
(Continued)

(52) U.S. Cl.
CPC ............... *G06T 7/11* (2017.01); *G06F 16/29* (2019.01); *G06F 16/51* (2019.01); *G06F 16/55* (2019.01); *G06F 16/5838* (2019.01); *G06F 16/5862* (2019.01); *G06T 5/002* (2013.01); *G06T 7/13* (2017.01); *G06T 7/40* (2013.01); *G06T 7/90* (2017.01); *G06V 10/54* (2022.01); *G06V 10/56* (2022.01); *G06T 2207/10024* (2013.01); *G06V 20/13* (2022.01)

(58) Field of Classification Search
None
See application file for complete search history.

(56) References Cited

U.S. PATENT DOCUMENTS

2018/0342073 A1* 11/2018 Matsumura .............. G01V 1/50

FOREIGN PATENT DOCUMENTS

CN        105719327 A  *  6/2016  ........... G06T 11/001

OTHER PUBLICATIONS

Hoang, M.A.—"Color texture measurement and segmentation"—2004 Elsevier—pp. 265-275 (Year: 2004).*

* cited by examiner

*Primary Examiner* — Bernard Krasnic
(74) *Attorney, Agent, or Firm* — DLA Piper LLP (US)

(57) ABSTRACT

A method for making texture symbols of a land use classification map is disclosed in the disclosure, including: capture of texture materials; extraction of main colors; color clustering; extraction of a texture skeleton; tile effect removal; and establishment of a texture library. The disclosure has the following advantages: definitions and classes of texture symbols are provided, and a procedure of making texture symbols is made clear; used natural texture symbols and symbolic texture symbols have clear semantic meanings, facilitating information transfer of the map; the quality and layering of the map are improved; the texture symbols can be directly used for production, to provide a fundamental support for survey and mapping of land use, and also to provide a solution for large-scale result mapping of natural resource survey. The expression of thematic maps of current land use classification is improved.

3 Claims, 19 Drawing Sheets
(18 of 19 Drawing Sheet(s) Filed in Color)

(51) Int. Cl.
  *G06F 16/51* (2019.01)
  *G06T 7/40* (2017.01)
  *G06T 7/13* (2017.01)
  *G06T 7/90* (2017.01)
  *G06F 16/583* (2019.01)
  *G06F 16/29* (2019.01)
  *G06T 5/00* (2006.01)
  *G06V 10/56* (2022.01)
  *G06V 10/54* (2022.01)
  *G06V 20/13* (2022.01)

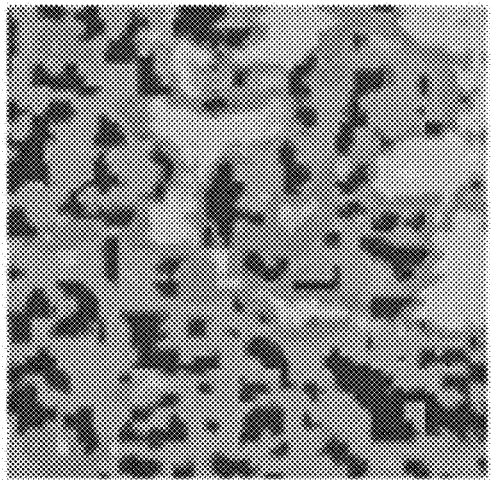
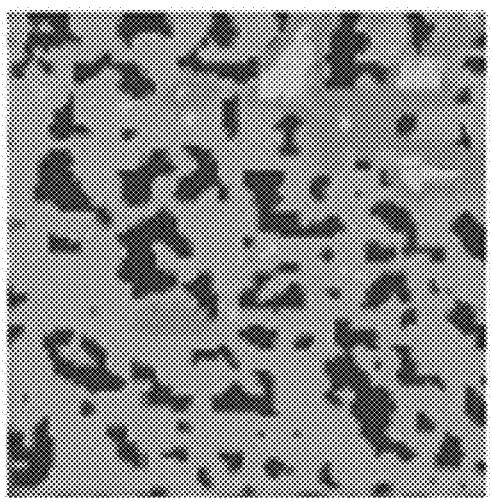
FIG. 4

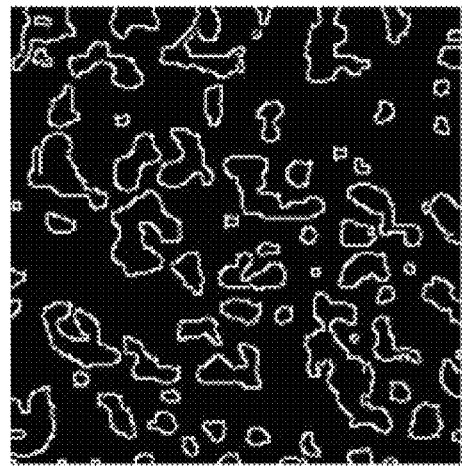
Texture skeleton effect
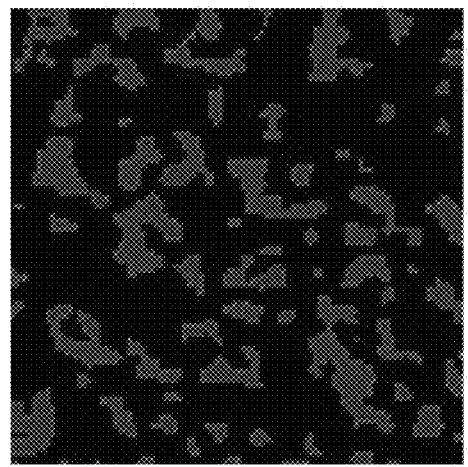
Segmented grassland
FIG. 10

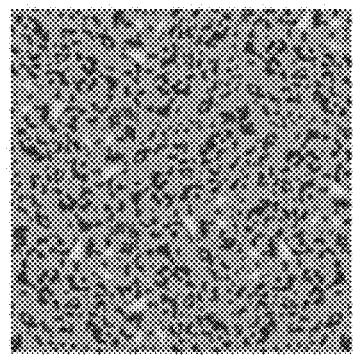
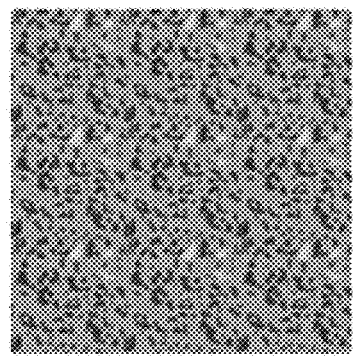
FIG. 12

FIG. 15

| First-level class | Second-level class | Season | Texture symbol legend |
|---|---|---|---|
| First-level class | Paddy field | Spring and summer | |
| | | Autumn | |
| | | Winter | |
| | Irrigable land | Spring and summer | |
| | | Autumn | |
| | | Winter | |
| | Natural grassland | Spring and summer | |
| | | Autumn | |
| | | Winter | |

| First-level class | Second-level class | Season | Texture symbol legend |
|---|---|---|---|
| Forest land | Arbor forest land | Spring and summer | |
| | | Autumn | |
| | | Winter | |
| | Shrub land | Spring and summer | |
| | | Autumn | |
| | | Winter | |
| Garden land | Orchard | Spring and summer | |
| | | Autumn | |

*FIG. 16*

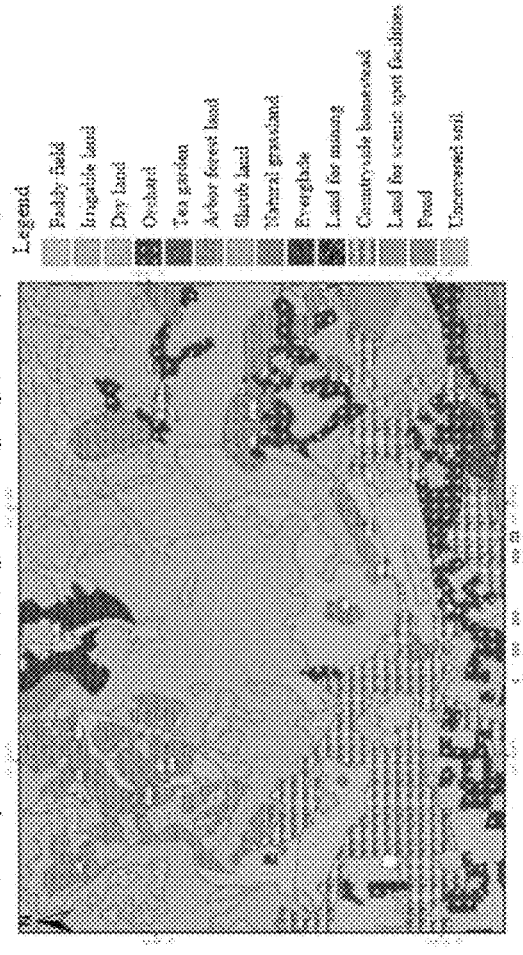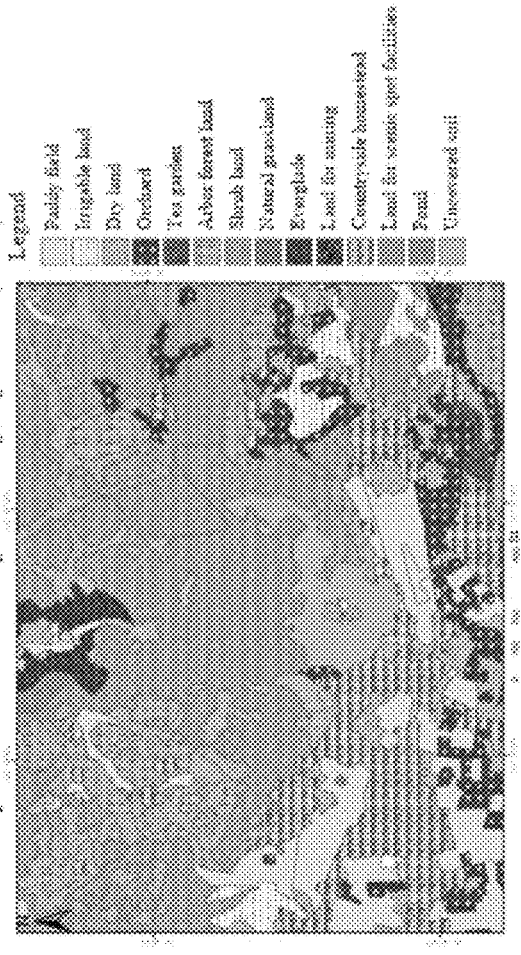
FIG. 18

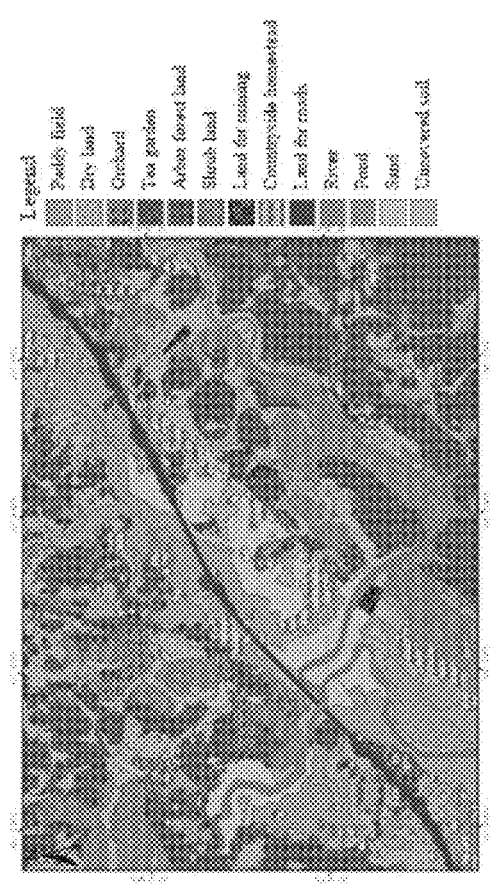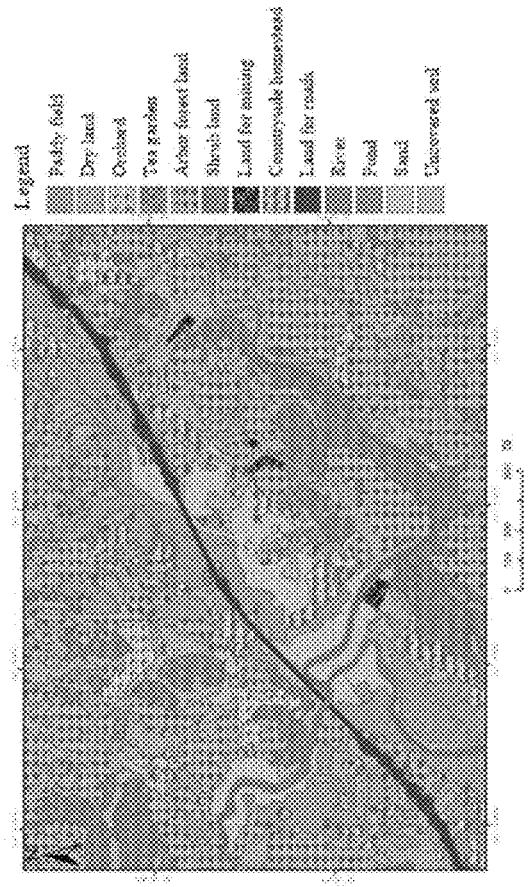
FIG. 19

METHOD FOR MAKING TEXTURE SYMBOL OF LAND USE CLASSIFICATION MAP

CROSS-REFERENCE TO RELATED APPLICATIONS

This application claims priority to Chinese Application Serial No. 201910974480.4, filed Oct. 14, 2019, the content of which is incorporated herein by reference in its entirety.

TECHNICAL FIELD

The disclosure relates to the field of map symbol technologies, and in particular, to a method for making texture symbols of a land use classification map.

BACKGROUND

A map typically includes map symbols. Therefore, map symbols are also known as a map language, which is the basic carrier and medium for people to understand the world. Generally, map symbols include three categories: graphic symbols, color symbols, and annotations (text description on the map, including words and numbers), which are used for representing features such as spatial distribution, quantity and quality of drafting objects.

The graphic symbols are generally classified into point symbols, line symbols, and area symbols according to basic shapes.

A point symbol is generally used for generalization and abstraction of a natural object with a point property, and its location has an explicit positioning concept, while the size of the symbol is merely used for classification but does not mean an actual implication.

A line symbol is generally used for generalization and abstraction of a natural object that has a length, width and direction significance, and its length and direction has a practical significance, while its width depends on a mapping scale. The width has a practical significance in a large scale and has a classification significance in a small scale.

An area symbol is generally used for generalization and abstraction of a natural object that has a scope (area) significance, which has practical two-dimensional features. The location of area symbol, the area of area symbol and the shape of area symbol are consistent with those of the actual natural object. The content of the map symbols includes point symbols, line symbols and area symbols, where the specific meanings are shown in Table 1.

TABLE 1

Meanings of Map Symbols

| SN | Map symbol | Examples in the figure | Meaning | Description |
|---|---|---|---|---|
| 1. | Point symbols | Beijing, Tianjin, Shijiazhuang, Baoding | Represent specific locations and city levels | Blue horizontal line |
| 2. | Line symbols | Beijing-Shijiazhuang Expressway, Great Wall in Hebei Province | Represent lengths and directions | Red broken lines |
| 3. | Area symbols | Beijing administrative division, Bohai area | Represent areas and shapes | Purple and blue areas |
| 4. | Annotations | Beijing, Hengshan 2017, Yellow River Estuary | Description of various symbols | Black, blue |

In terms of expression of the land use classification map, symbols are further subdivided. Essentially, map symbols are mainly used for solving the question which is classification and grading of the feature objects. According to the national standard of current land use classification GB/T 21010, a two-level classification system is used for the current land use, including 12 first-level classes and 56 second-level classes. The first-level classes are major categories, specifically including: cultivated land, garden land, forest land, grassland, land for commercial services, land for industrial and mining warehousing, residential land, land for public administration and public services, land for special use, land for transportation, water areas and land for water conservancy facilities, others. The second-level classes are subdivisions based on the first-level classes. For example, the cultivated land is subdivided into three levels: paddy field, irrigable land, and dry land. See Table 2. According to Table 2, the symbol of the cultivated land is defined by two types of elements: background color and primitive. The gradient yellow color represents levels of the cultivated land, where the color of the paddy field is (255, 255, 100), the color of the irrigable land is (255, 255, 150), and the color of the dry land is (255, 255, 200). The specific primitives represent specific level types. "" represents the paddy field, "" represents the irrigable land, and "" represents the dry land. The colors of the primitives are uniformly defined to be green (0, 160, 100). The symbol grading of the forest land is similar to that of the cultivated land.

TABLE 2

Codes and Meanings of Land Types in Land Use Classification

| Class code | Level code | Meaning | | Symbol | Color | Description |
|---|---|---|---|---|---|---|
| 01 Cultivated land | 011 | Paddy field | Cultivated land for growing aquatic crops such as rice and lotus root. | See corresponding texture symbol in FIG. 15 | 0, 160, 100 255, 255, 100 | Green primitives Gradient background |
| | 012 | Irrigable land | Cultivated land with a guaranteed water source and irrigation facilities, which can be normally irrigated in average years and used for growing xeric crops. | See corresponding texture symbol in FIG. 15 | 0, 160, 100 255, 255, 150 | |
| | 013 | Dry land | Cultivated land without irrigation facilities, which is mainly used for growing xeric crops relying on natural precipitation. | See corresponding texture symbol in FIG. 15 | 0, 160, 100 255, 255, 200 | |
| 03 Forest land | 031 | Closed forest land | Arbor forest land with tree canopy density greater than or equal to 0.2, including mangrove forest land and bamboo forest land. | See corresponding texture symbol in FIG. 15 | 0, 0, 0 40, 140, 0 | Black primitives Gradient background |
| | 032 | Shrub land | Forest land with shrub coverage greater than or equal to 40%. | See corresponding texture symbol in FIG. 15 | 0, 0, 0 85, 180, 100 | |
| | 033 | Other forest land | Including forest land such as open forest land, young afforested land, cut-over land, and nursery. | See corresponding texture symbol in FIG. 15 | 0, 0, 0 140, 215, 130 | |

Maps of current land use are generally at three scales: 1:5000 to 1:10000, known as a large scale; 1:25000 to 1:100000, known as a medium scale; and 1:250000 to 1:1000000, known as a small scale. The large scale is mainly used for mapping of a small region, the medium scale is mainly used for mapping of a county territory, and the small scale is mainly used for mapping of a provincial or national level. Generally, in small-scale mapping, the land use symbols are used for representing primary classes, that is, only representing land types of the 12 primary classes. Correspondingly, the symbols are only expressed in the form of color. In medium-scale mapping, the land use symbols are used for representing levels under the primary classes, that is, representing land types of the 56 second-level classes. Correspondingly, the symbols are expressed in the form of color+primitive. Currently, in large-scale mapping, the land use symbols are still expressed in the same form as the symbols in the medium scale.

In 3D landscape and virtual reality technologies, a texture making technology is used for simulation and restoration of the surface landscape. However, there is ongoing research about the texture making technology in cartography and semiology, including a method for making a landscape texture based on a vector map.

As the geometrical morphology on the earth surface is complex and diversified, expressing all detailed structures with a geometrical model can require a tremendous amount of computing on the one hand but also may have to meet the requirement of real-time display and reflect texture characteristic desirably on the other hand. By mapping a surface texture with rich details to a simplified topographic model, it not only improves interaction efficiency significantly, but also helps enhance the sense of reality of a virtual geographic environment, thus facilitating perception of the geographic environment. Therefore, generating a vivid and easily perceivable landscape texture is an important link for establishing a virtual geographic environment.

The basic thinking of making a landscape texture is as follows:
1) establishing a geographic environment and setting colors layer by layer, and making a hill shading map as the background of the landscape texture;
2) using symbols to signify all features, and obtaining element images one by one;
3) performing different texture effect processing on various element images; and
4) synthesizing all layers of images according to a specific sequence, to generate a final texture.

In the texture effect processing of the third step, processing is performed by using some picture effects in a type library of Photoshop in C++: for example, grain emboss, and outer bevel (depression), so that the obtained landscape texture has a three-dimensional effect.

In the current expression of the map of current land use, there are mainly the following defects:
1. For a map with a large scale, polygons (ranges of different land use types) on the map are generally large. Especially, for a large-area map of a single land type, there are only one to two classes of features on the whole map. If the current map symbol expression method is used, the picture is dull, lacking rich semantic meanings and the sense of beauty required for the map.
2. The landscape texture method achieves a good rendering effect on an ordinary wall map with a small scale. The surface 3D effect is displayed through embossing, so that a clear landscape texture effect can be achieved. However, there is no successful case for expression of the land use classification map with a large scale. In addition, the method mainly virtualizes the surface landscape abstractly, and fails to meet the requirement that a map symbol needs to have a clear semantic meaning.

3. All current land use classification symbols are static abstract symbols, which cannot express changes of the land types quantitatively.

SUMMARY

In view of the defects of the prior art, the disclosure provides a method for making texture symbols of a land use classification map, to solve the defects in previous systems.

To achieve the above purpose, the present disclosure provides the following technical solutions.

A method for making texture symbols of a land use classification map includes the following steps:

(1) capture of texture materials;

wherein the texture materials are mainly acquired from three sources, which are satellite images, real-scene photos, and paintings; and according to different feature types and different sources of texture materials of the feature types, the texture materials are classified;

(2) extraction of main colors, wherein basic steps of main color extraction based on a hue, saturation, value (HSV) color space are as follows:

1) creating two dictionaries, one being used for recording color classes and the quantity of color classes, and the other being used for recording an HSV value of each pixel and a color class corresponding to each pixel;

2) reading a texture polygon to be processed, and acquiring HSV values pixel by pixel;

3) comparing the HSV values with a color component table, to determine a color class of a current pixel;

4) incrementing a count of the current color class by 1 and recording the count into the first dictionary, and at the same time recording the HSV value and color of the current pixel into the second dictionary; and 5) after the processing is finished, acquiring the quantity of color classes of the current polygon and the quantity of pixels in each different color from the first dictionary, obtaining HSV values of all the pixels in each color from the second dictionary, and acquiring color values with relatively high frequencies of occurrence through statistics collection;

(3) color clustering;

wherein noise in an original image is removed; colors of the same color scheme in the photo or image are clustered together, so that different color schemes are distinguished more clearly; after extraction of the main colors from the texture polygon, the quantity of the main colors of the feature texture polygon is obtained, thus achieving a color clustering effect; texture segmentation is performed according to a correspondence between the quantity of color clusters and the quantity of texture layers, and a specific method is to reserve pixels in different main color classes of the texture polygon, and set other pixels to pure black, that is, set HSV values of other pixels to (0, 0, 0);

(4) extraction of a texture skeleton;

wherein after the texture segmentation, a primary texture layer and a secondary texture layer for forming an image texture symbol are obtained; next, other noise information and color information are eliminated, to extract the texture skeleton; the obtained texture skeleton is added to a texture library as a synthesis material of an image texture symbol, for use in mapping;

an edge detection algorithm using a Canny operator is used for extracting the texture skeleton; a texture skeleton image generated after the edge detection using the Canny operator is a single-channel grayscale image, which needs to be converted into a three-channel image for a next coloring step;

when the skeleton texture is stored into the texture library, index information such as a sequence number of the skeleton texture, a season, and a corresponding main color are added to a file name, for query and calling in subsequent use of the texture symbol; and a value of the main color obtained through clustering is assigned to a closed region in the texture skeleton, to generate the corresponding primary texture layer, and the secondary texture layer is processed in the same manner; for a background layer, a pure-color layer is generated according to a color value of a corresponding feature in a regulation; the color value herein is an optional parameter;

(5) tile effect removal;

there are two methods for removing a tile effect generated by texture arrangement in tiles: flipping and image stitching, and a Wei-Levoy texture synthesis algorithm;

flipping and image stitching means performing 90° flipping, 180° flipping, and mirror flipping on an original texture image with a size of 50 pixels×50 pixels, and then stitching into a large-size image;

Wei-Levoy algorithm: generating a large random image with a size of 150 pixels×150 pixels first, then comparing each pixel and its neighborhood pixels in the random image with an original texture image having a size of 50 pixels×50 pixels, to find a neighborhood in the original texture image which is most similar to a current neighborhood of the random image, and then assigning values of closest pixels in the original texture image to the large random image; a texture image after the algorithm processing is compared with a texture image obtained through direct stitching;

(6) establishment of a texture library;

texture skeletons and area texture feature symbols for different features are made according to a corresponding standard procedure and corresponding rules, and stored in the texture library, to be combined and used by map designers;

a structure of the texture library needs to be classified according to different thematic map types, wherein there are one or more groups of finished image texture symbols under each second-level class, which are distinguished by "second-level class name" +"numeric sequence number"; next, seasonal characteristics of image or picture sources during making of image texture symbols in the current group are provided; further, two function classes of different images are provided; one class is image texture symbols that can be directly used for map rendering; the other class is skeleton polygon materials for making image texture symbols; default color HSV values for making texture symbols are marked after skeleton file names of the primary and secondary texture layers that require coloring, so that a user can perform sample image-based texture generation or autonomous coloring again, to obtain area texture symbols of different styles; and if the primary texture layer is formed by mixing texture polygons in colors having different shades and belonging to the same color scheme, the skeleton of the primary texture layer may have more than one image.

Further, in a process of making a non-natural feature texture in step (3), image characteristics are extracted from a real-scene photo, and extraction of the main colors is implemented by shrinking an original image, while color clustering is not performed.

Further, for a non-natural feature with a symbolic semantic meaning in step (4), an image of a primary texture layer is obtained through image shrinking and background stripping, and a background layer is made according to stipulations about background layer colors in land class color codes of national land survey.

Compared with previous attempts, the disclosure has the following advantages:

1. Definitions and classes of texture symbols are provided, and a procedure of making texture symbols is made clear.

2. Different from the abstract symbols used in the conventional classification of current land use, natural texture symbols and symbolic texture symbols have clear semantic meanings, facilitating information transfer of the map.

3. The texture symbols are vector symbols, which achieve a map rendering effect much better than a filling effect of the conventional picture symbols, thus improving the quality and layering of the map.

4. The natural texture symbols are quantitative map symbols, which can describe practical coverage conditions of land types by changing proportions of a primary texture and a secondary texture. Moreover, by replacement of a background layer, seasonal changes of land types on the map can be expressed as a whole.

5. According to different purposes of the map, a brightness value V of the texture symbols can be adjusted, to avoid discomfort caused by saturated colors in the current map to map users.

6. The texture symbols can be directly used for production, to provide a fundamental support for survey and mapping of land use, and also provide a solution for large-scale result mapping of natural resource survey.

7. On the basis of the current abstract symbols, a map symbol using rule for making large-scale, medium-scale, and small-scale thematic maps of current land use classification is formed, thus improving the expression of the thematic maps of current land use classification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a schematic diagram of a proportion of a secondary texture layer, according to some embodiments of the disclosure.

FIG. 10 is a schematic diagram of texture skeleton extraction, according to some embodiments of the disclosure.

FIG. 12 is a schematic diagram of a grassland texture after mirroring, according to some embodiments of the disclosure.

FIG. 15 is a diagram of an example of texture symbols of current land use classification, according to some embodiments of the disclosure.

FIG. 16 is a diagram of an example of seasonal changes of texture symbols with natural semantic meanings, according to some embodiments of the disclosure.

FIG. 18 is a comparison diagram of changes of texture symbols in different seasons, according to some embodiments of the disclosure.

FIG. 19 is a comparison diagram of different brightness values of texture symbols, according to some embodiments of the disclosure.

DETAILED DESCRIPTION

To make the objectives, technical solutions, and advantages of the disclosure clearer, the following further describes the disclosure in detail according to the accompanying drawings and embodiments.

Figure 1:
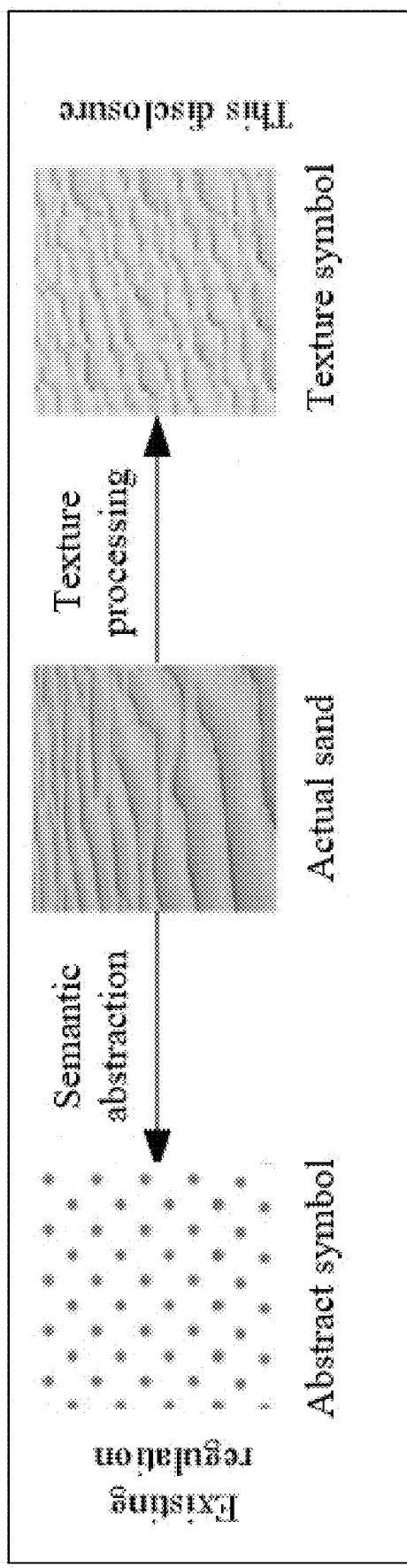
FIG. 1 is a schematic diagram of definitions of texture symbols, according to some embodiments of the disclosure.

A texture is how the surface of a feature on an image feels (smooth, rough, exquisite, and the like), and different layers are divided generally according to the smoothness/roughness. The texture, as a variable, not only depends on a surface characteristic, but is also related to an illumination angle. An image texture is a visual characteristic to reflect a homogeneity phenomenon in an image, and it embodies an organization attribute of a surface structure that changes slowly or periodically on the surface of an object. A remote-sensing image texture generally corresponds to a corresponding feature type. Embodiments of the present disclosure can provide methods to construct texture symbols with special semantic meanings (as shown in FIG. 1) based such a characteristic that different features have special textures, to correspond to existing abstract symbols in a one-to-one manner, thus forming a normalized texture symbol system applied to a large-scale map of current land use, so that a special expression method for the map of current land use is formed.

1. Data Source of Texture Symbols

As the name suggests, a texture symbol represents an actual feature type by using a texture characteristic of a feature. Therefore, the data source of the texture symbol is mainly data of remote-sensing images, which is not limited to images. The texture symbol may also be extracted from a real-scene photo or a landscape painting.

2. Classification of Texture Symbols

The texture symbol is characterized in that the components of the symbols are directly taken from image data or other real-scene data, which omits a semantic translation and mapping process in terms of expression of a feature attribute, so that the feature attribute can be directly conveyed to a map reader.

According to the existing land use classification regulation, the texture symbols are classified into two categories: one category is land class symbols corresponding to natural features, which are referred to as natural texture symbols. For example, this may include cultivated land, forest land, and grassland. The other category is land class symbols corresponding to non-natural features (artificial features), which are referred to as artificial texture symbols. This may include, for example, residential land, land for entertainment, and land for commercial services. As the natural features have distinctive texture characteristics and are easy to recognize, physical textures can be directly extracted to make symbols. Such texture symbols are also known as "texture symbols with natural semantic meanings." The non-natural features, such as land for commercial services and residential land, which contain complex information and hardly have any regular texture units, can be difficult to extract physical textures from. Therefore, the non-natural features are represented by using uniform symbolic texture primitives, and such texture symbols are also known as "texture symbols with symbolic semantic meanings."

3. Composition of Texture Symbols

Figure 2:
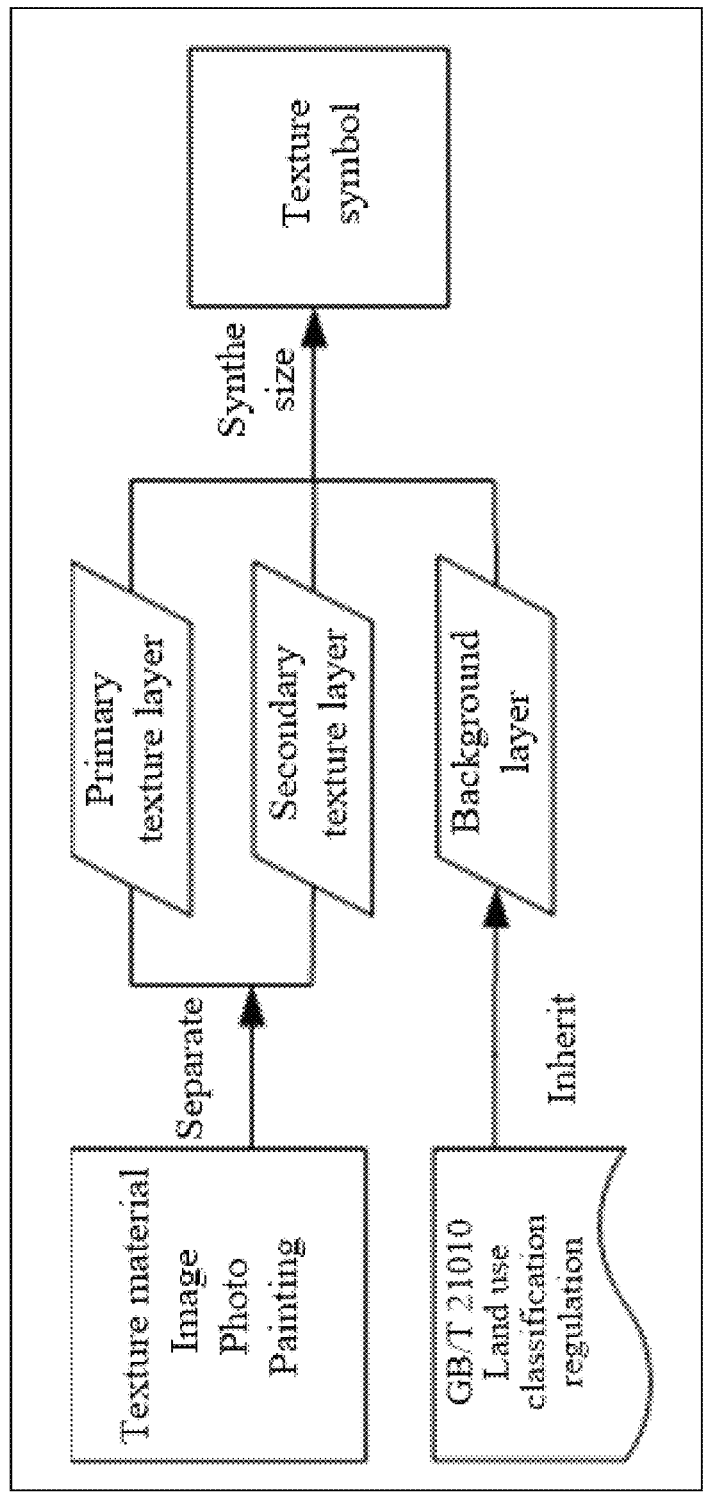
FIG. 2 is a schematic diagram of compositions of texture symbols, according to some embodiments of the disclosure.

A texture symbol can include different layers, mainly including a primary texture layer, a secondary texture layer, and a background layer. Different layers take on different semantic contents. The primary texture layer represents a core texture characteristic of a feature, such as leaves of arbor forest and grass of natural grassland. Due to coverage of vegetation, vegetation on the earth surface is diversified. To depict detailed characteristics of textures, a secondary texture layer is established to assist in expression of characteristics of primary textures, such as trunks in arbor forest and uncovered soil in natural grassland. The background layer represents a class color of the feature in the existing regulation, which is determined according to color codes of color symbols in the land use regulation. During making of an image texture symbol, the three layers are separated through processing such as color clustering and segmentation, and then a series of processing such as edge extraction and coloring is performed respectively. Finally, the three layers are combined to form a texture symbol, as shown in FIG. 2.

The primary texture layer and the secondary texture layer are obtained from the texture data source, and the background layer is obtained from the existing regulation, so that the semantic meanings of different symbol systems are consistent with the existing national standard. A natural texture symbol consists of three layers, that is, a primary texture layer, a secondary texture layer, and a background layer. A symbolic texture symbol consists of two layers, that is, a primary texture layer and a background layer.

4. Semantic Meanings of Texture Symbols

Figure 3:
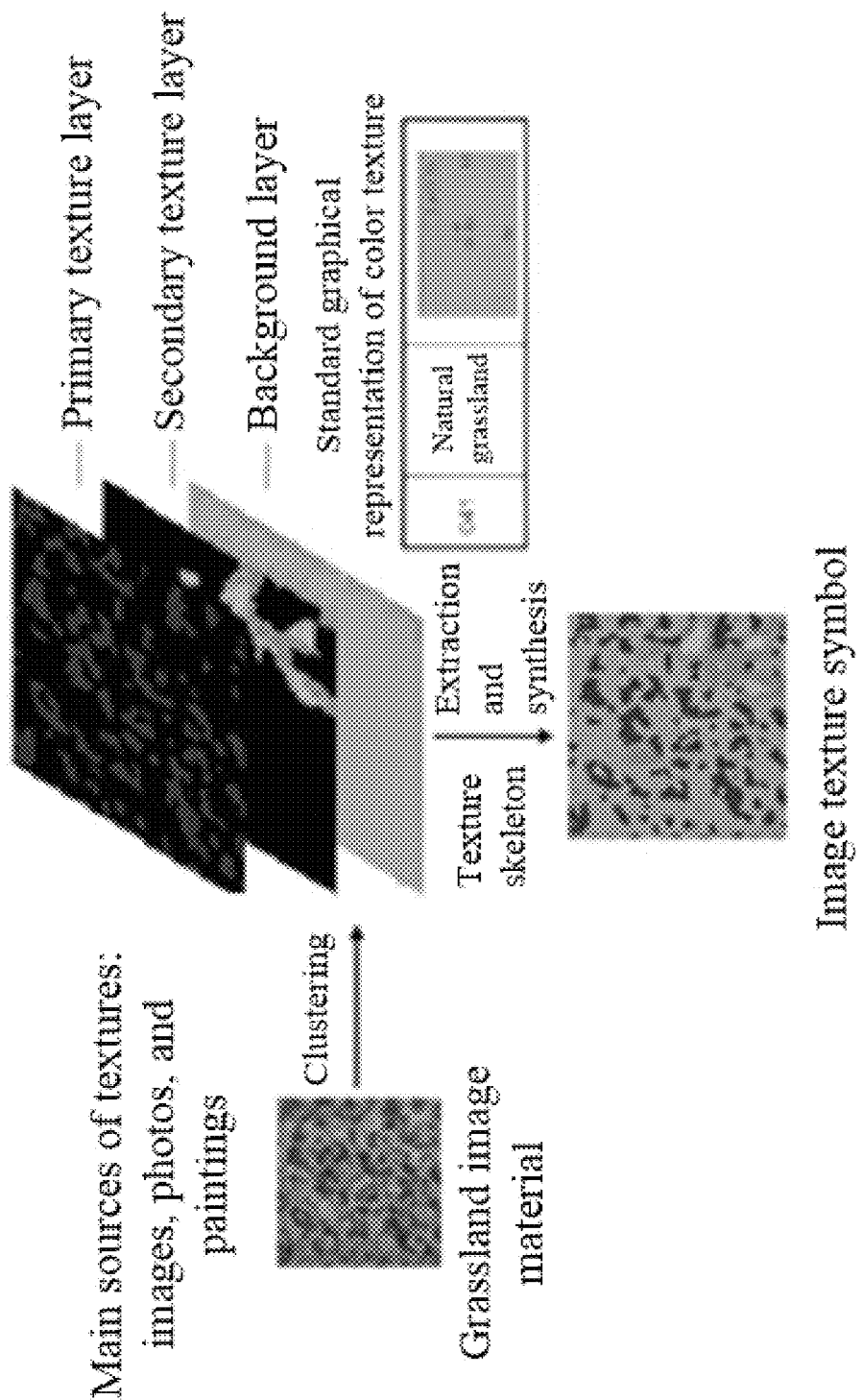
FIG. 3 is a schematic structural diagram of a texture symbol of grassland, according to some embodiments of the disclosure.

Map symbols are essentially used for conveying semantic meanings. The advantage of the texture symbol lies in clear semantic information. For example, in the grassland texture symbol shown in FIG. 3, the primary texture layer expresses a texture of grassland, the secondary texture layer expresses a texture of uncovered soil in the grassland, and the background layer directly uses the color of natural grassland defined in the existing regulation. The texture symbol obtained after synthesis not only directly depicts texture characteristics of the grassland, but also quantitatively describes the growth of the grassland. By adjusting a proportion of the secondary texture layer, development or degradation of the grassland can be represented, to form a dynamic quantitative index that cannot be expressed by the conventional symbol, as shown in FIG. 4.

Figure 5:
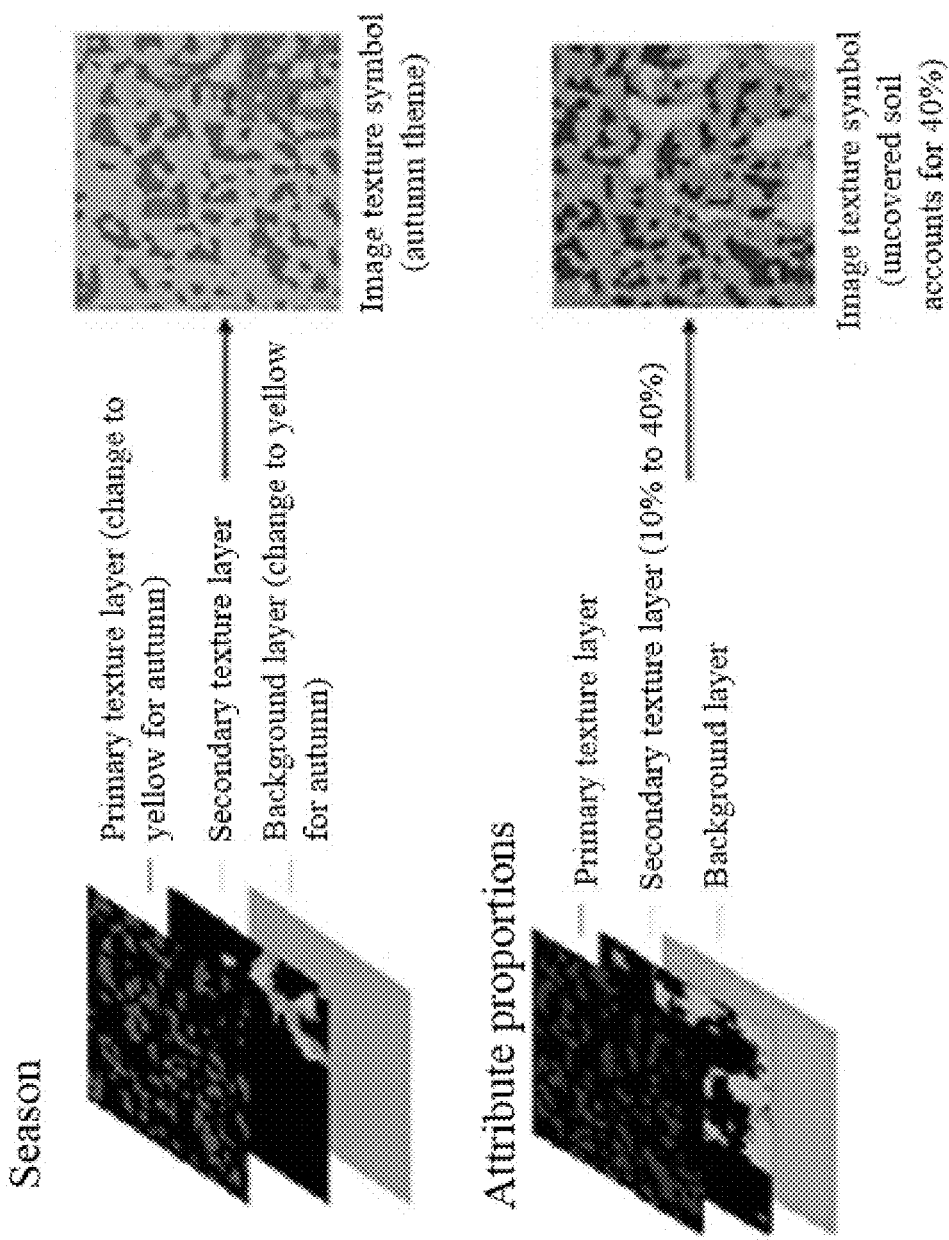
FIG. 5 is a diagram of seasonal changes of texture symbols, according to some embodiments of the disclosure.

Another characteristic of the texture symbol is that it changes the invariable expression manner of the conventional symbol, so that the map can change with seasons. Rich map expression techniques are formed without changing the semantic meanings of the map symbols. As shown in FIG. 5, seasonal changes of the map can be implemented by merely changing the color of the background layer. The background layer in green represents spring and summer, the background layer in earthy yellow represents autumn, and the background layer in white gray represents winter.

Texture symbols of artificial land types are mainly used for representing buildings, structures, and facilities. Characters of such features cannot be depicted with simple textures. Therefore, a symbol is used as a primary texture layer, and after superposition with a background layer, a symbolic texture symbol is directly created.

Figure 6:
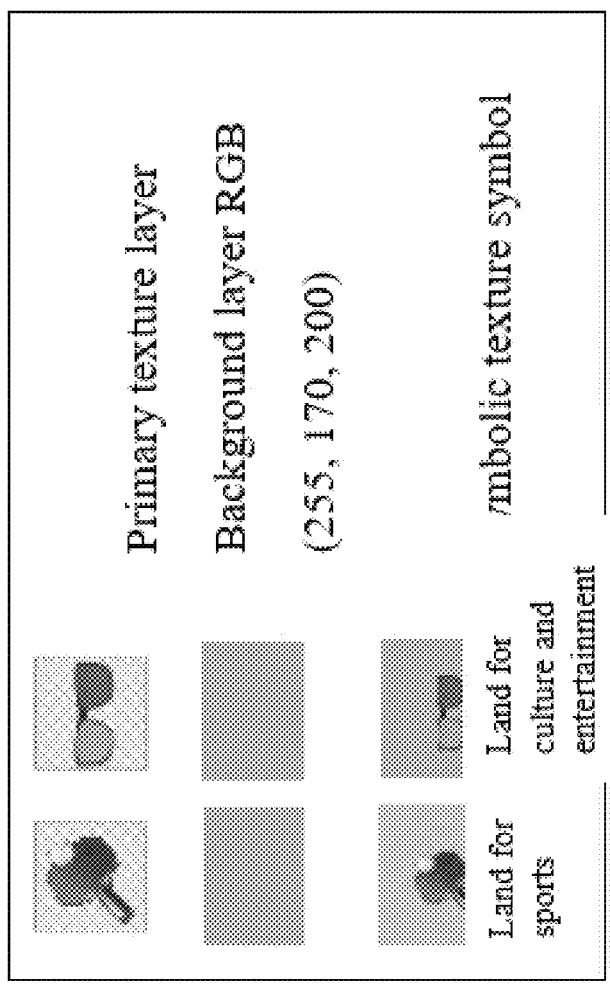
FIG. 6 is a schematic structural diagram of texture symbols with symbolic semantic meanings, according to some embodiments of the disclosure.

Such symbols have very clear semantic meanings, and all symbolic symbols come from commonly used symbols in daily life. For example, a fork shape represents catering land, a red cross shape represents land for medial use, a temple shape represents land for religious use, a glasses shape represents land for culture and entertainment, a table tennis shape represents land for sports, and so on, as shown in FIG. 6.

5. Making of Texture Symbols

Generally, textures are irregular locally and regular globally. Therefore, regularity-prevailing textures (uniform textures) and randomness-prevailing textures (non-uniform textures) are formed. A uniform texture has obvious characteristics of being periodic, directional and regular, while a non-uniform texture is random.

Figure 7:
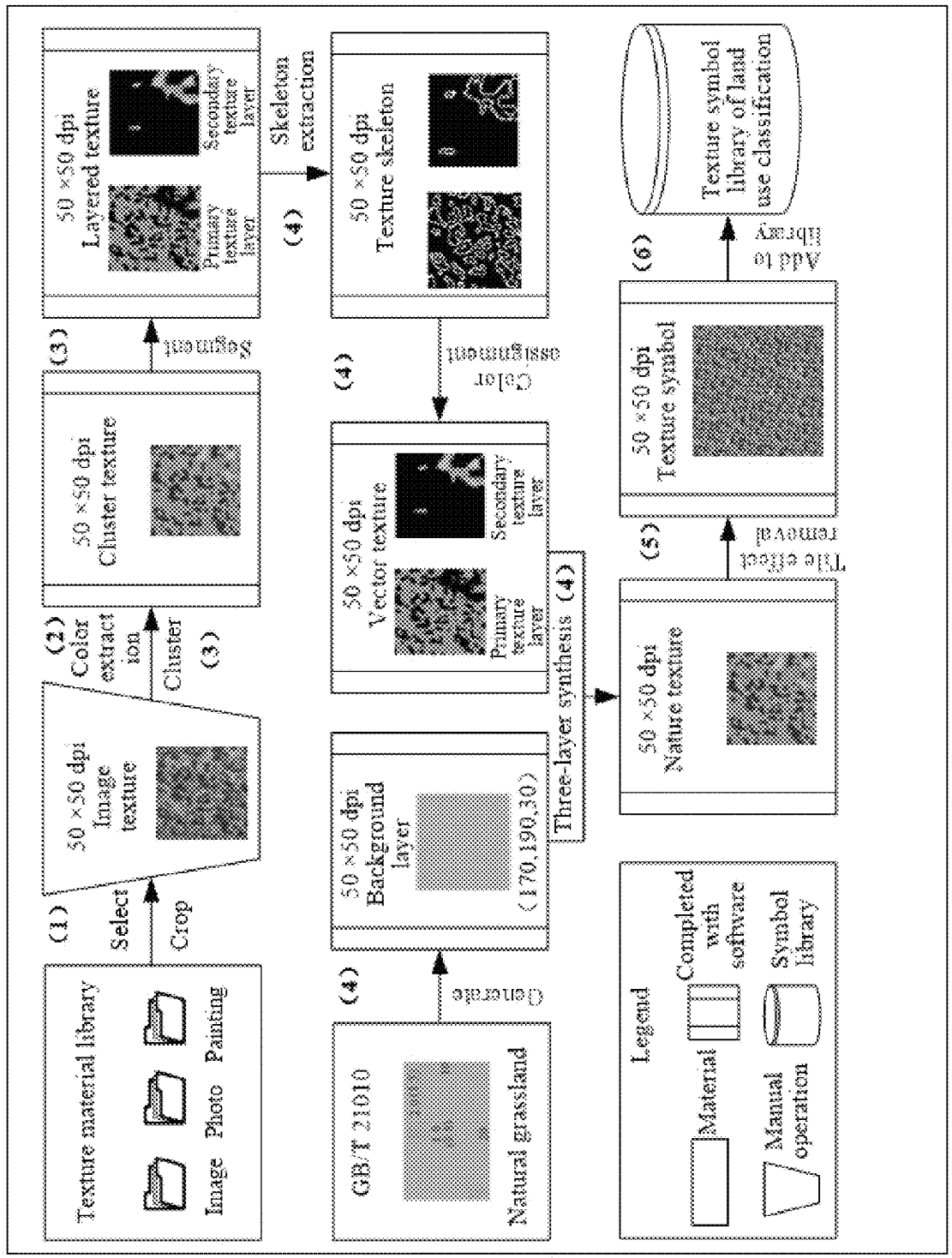
FIG. 7 is a flowchart of making texture symbols, according to some embodiments of the disclosure.

Making a texture symbol involves processes such as acquisition and cropping of texture materials, extraction and clustering of colors, extraction of a texture skeleton, generation of a background color, and synthesis of multiple layers. FIG. 7 shows a flowchart of making a texture symbol.

(1) Capture of Texture Materials

Texture materials in the disclosure are mainly acquired from three sources, which are satellite images, real-scene photos, and paintings. According to different feature types and different sources of texture materials thereof, during making of texture symbols for land use classification, texture materials of five land types, including 01 cultivated land, 03 forest land, 04 grassland, 11 water areas and land for water conservancy facilities and 12 others, which are from satellite images. For 02 garden land, 06 land for industrial and mining warehousing, and 07 residential land, due to special detail characteristics thereof, materials are from real-scene photos. As textures of 05 land for commercial services, 08 land for public administration and public services, 09 land for special use and 10 land for transportation are textures with symbolic semantic meanings, texture materials are extracted from real-scene photos.

(2) Extraction of Main Colors

A polygon of a feature generally consists of basic elements of the feature, for example, grass and soil of grassland, and leaves and trunks of forest land. These elements generally belong to different color schemes. When the elements are used together, colors of the elements are distinguished from each other, so that texture information is expressed more desirably, to better convey the meaning of the symbol. Therefore, main colors need to be extracted from the colors of the polygons.

As for classification of colors, common colors of features are further divided according to refined HSV color component ranges, to avoid that all extracted colors fall in the same class.

Basic steps of main color extraction based on an HSV color space are as follows:

1) creating two dictionaries, one being used for recording color classes and the quantity of color classes, and the other being used for recording an HSV value of each pixel and a color class corresponding to each pixel;

2) reading a texture polygon to be processed, and acquiring HSV values pixel by pixel;

3) comparing the HSV values with a color component table, to determine a color class of a current pixel;

4) incrementing a count of the current color class by 1 and recording the count into the first dictionary, and at the same time recording the HSV value and color of the current pixel into the second dictionary; and 5) after the processing is finished, acquiring the quantity of color classes of the current polygon and the quantity of pixels in each different color from the first dictionary, obtaining HSV values of all the pixels in each color from the second dictionary, and acquiring color values with relatively high frequencies of occurrence through statistics collection, for later use.

Using a polygon of a grassland texture in natural features as an example, main colors are extracted from a cropped texture material polygon with a size of 50 pixels×50 pixels. Color classes with the highest numbers of occurrence in the polygon are arranged in order, and an HSV value that occurs for the highest number of times in the color class is added behind the color, for use in subsequent color filling of a texture skeleton.

(3) Color Clustering

Polygons of texture samples used in the disclosure are mostly obtained from remote-sensing images and real-object photos that include a relatively large amount of noise, and colors of the same class often appear many times with different gray values. Color clustering is performed to remove noise in the original image and eliminate impact of irrelevant information to make the image clearer on the one hand; on the other hand, through image clustering, colors of the same color scheme in the photo or image are clustered together, so that different color schemes are distinguished more clearly, and textures of a source image can be acquired more accurately in the process of texture skeleton extraction.

Figure 8:
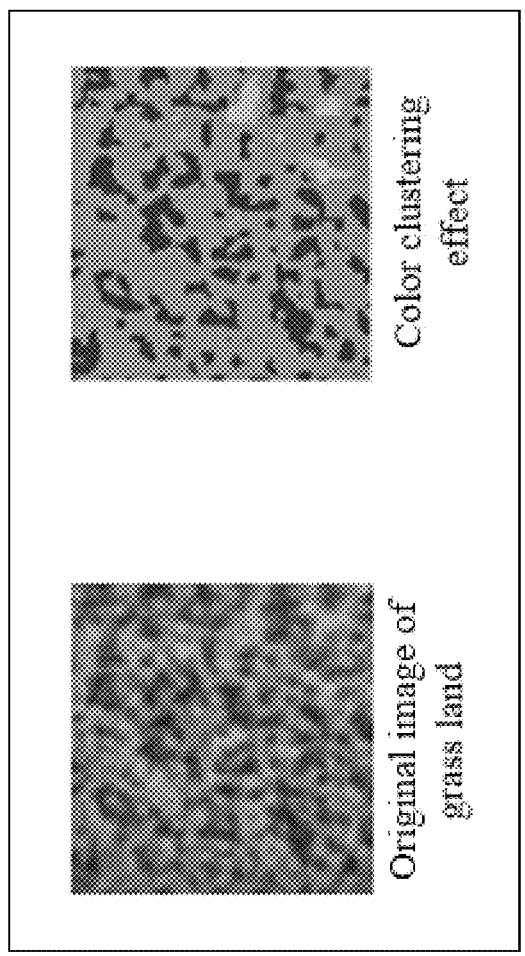
FIG. 8 is a schematic diagram of color clustering, according to some embodiments of the disclosure.
Figure 9:
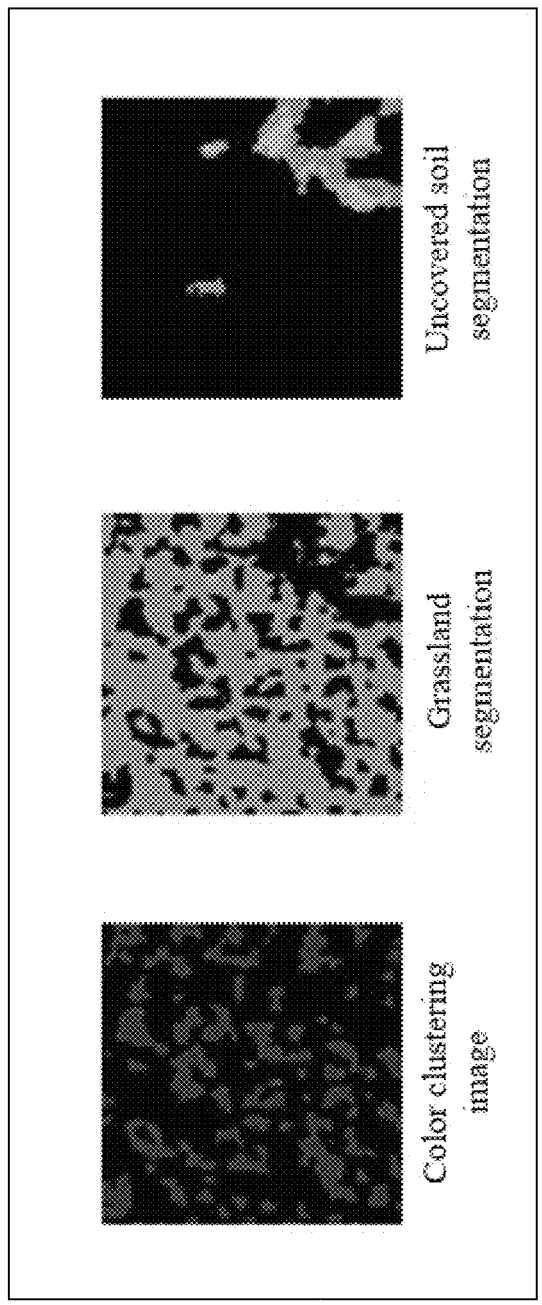
FIG. 9 is a schematic diagram of texture segmentation, according to some embodiments of the disclosure.

After extraction of the main colors from the texture polygon, the quantity of main colors of the feature texture polygon can be obtained more clearly, thus achieving a color clustering effect. Texture segmentation is performed according to a correspondence between the quantity of color clusters and the quantity of texture layers. A specific method is to reserve pixels in different main color classes of the texture polygon, and set other pixels to pure black, that is, set HSV values of other pixels to (0, 0, 0). Color clustering and texture segmentation are shown in FIG. 8 and FIG. 9.

In a process of making a non-natural feature texture, main image characteristics are extracted from a real-scene photo, and extraction of main colors is implemented by shrinking an original image, while color clustering is not performed.

(4) Extraction of a Texture Skeleton

After the texture segmentation, a primary texture layer and a secondary texture layer for forming an image texture symbol are obtained. Next, other noise information and color information are eliminated, to extract the texture skeleton. The obtained texture skeleton may be added to a texture library as a synthesis material of an image texture symbol, for use in mapping.

For extraction of the texture skeleton, an edge detection algorithm using a Canny operator is selected in the disclosure, which is characterized in that pixels with obvious brightness changes in a target image are detected, so that texture characteristics of a feature can be extracted effectively. The texture skeleton extracted from the texture is shown in FIG. 10.

It should be noted that, a texture skeleton image generated after the edge detection using the Canny operator is a single-channel grayscale image, which needs to be converted into a three-channel image for subsequent steps such as coloring.

The skeleton texture is stored into the texture library, and index information such as a sequence number of the skeleton texture, a season, and a corresponding main color are added to a file name, for query and application in subsequent use of the texture symbol.

Figure 11:
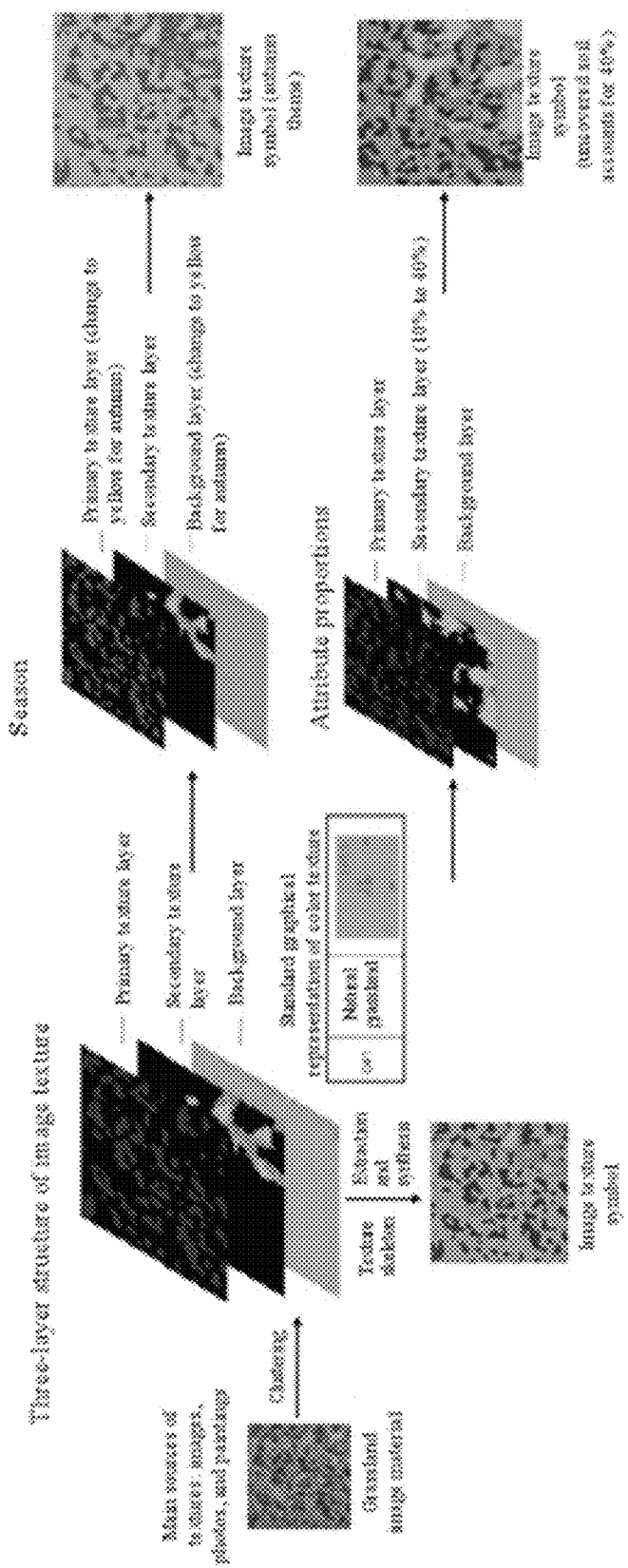
FIG. 11 is an overall schematic structural diagram of texture symbols, according to some embodiments of the disclosure.

The value of the main color obtained through clustering is assigned to a closed region in the texture skeleton, to generate the corresponding primary texture layer, and the secondary texture layer is processed in the same manner. For the background layer, a pure-color layer is generated according to the color value of the corresponding feature in the regulation. The color value herein is an optional parameter. For example, during making of a texture symbol of autumn or winter grassland, the green background can be replaced with a yellow or white/brown background to obtain texture symbols corresponding to different seasons. After the three texture layers are generated, the three layers may be superimposed one by one, to generate an integrated texture symbol, as shown in FIG. 11.

For a non-natural feature with a symbolic semantic meaning, an image of a primary texture layer is obtained through image shrinking and background stripping, and a background layer is made according to stipulations about background layer colors in land class color codes of national land survey. For example, for land for religious use, a background layer with a size of 50 pixels×50 pixels and a color of RGB (240, 100, 200) is made for superimposition, thus forming a non-natural feature symbol with a symbolic semantic meaning.

(5) Tile Effect Removal

On a map, feature types are generally expressed by using large area symbols. After symbols are made, area symbols are filled on the map surface in a tile arrangement manner during a map rendering process. If textured area symbols with a size of 50 pixels×50 pixels are used for map rendering, for symbols of grassland and forest land that use randomness-prevailing textures (non-uniform textures); if such small-sized symbols are directly used as feature symbols, a mapping effect is affected by the regular arrangement, making the map very dull.

Therefore, a tile effect generated by texture arrangement in tiles needs to be removed for some randomness-prevailing symbols. In the disclosure, two methods are used: flipping and image stitching, and a Wei-Levoy texture synthesis algorithm, which are described in the following.

Flipping and image stitching means performing processing such as 90° flipping, 180° flipping, and mirror flipping on an original texture image with a size of 50 pixels×50 pixels, and then stitching into a large-size image. There are eight specific flipping manners as follows: 1: original image; 2: 90° anticlockwise; 3: 180° anticlockwise; 4: 270° anticlockwise; 5: left-right mirror flipping; 6: 90° anticlockwise after left-right mirror flipping; 7: 180° anticlockwise after left-right mirror flipping; 8: 270° anticlockwise after left-right mirror flipping. A comparison between a texture image after flipping and combination and a texture image obtained through direct stitching is shown in FIG. 12.

Figure 13:
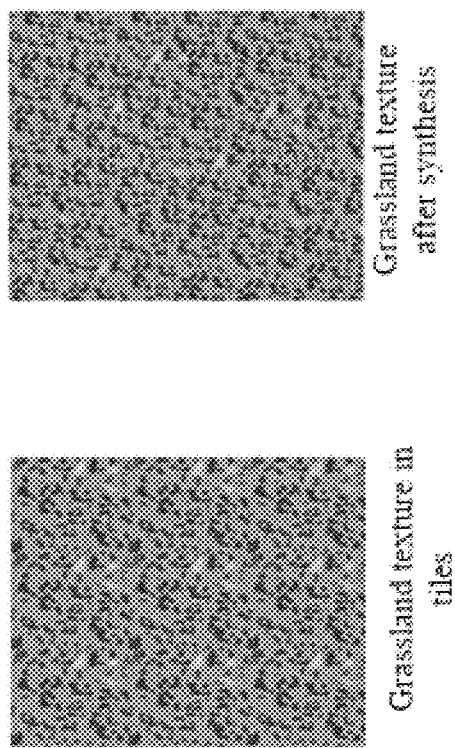
FIG. 13 is a schematic diagram of a grassland texture synthesized using a Wei-Levoy algorithm, according to some embodiments of the disclosure.

Wei-Levoy algorithm: The algorithm is a sample image-based texture synthesis algorithm. A specific principle is to generate a large random image with a size of 150 pixels×150 pixels first, then compare each pixel and its neighborhood pixels in the random image with an original texture image having a size of 50 pixels×50 pixels, to find a neighborhood in the original texture image which is most similar to a current neighborhood of the random image, and then assign values of closest pixels in the original texture image to the large random image. A comparison between a texture image after the algorithm processing and a texture image obtained through direct stitching is shown in FIG. 13.

(6) Establishment of a Texture Library

If a symbol is merely generated for a certain feature type and area texture symbols are generated on demand, efficiency of the mapping process is reduced. Moreover, it lacks a certain standard, so area texture symbols made by different people differ greatly, which can have an adverse effect on information expression of the map. Therefore, texture skeletons and area texture feature symbols for different features can be made according to a corresponding standard procedure and corresponding rules, and stored in the texture library, to be combined and used by map designers.

Figure 14:
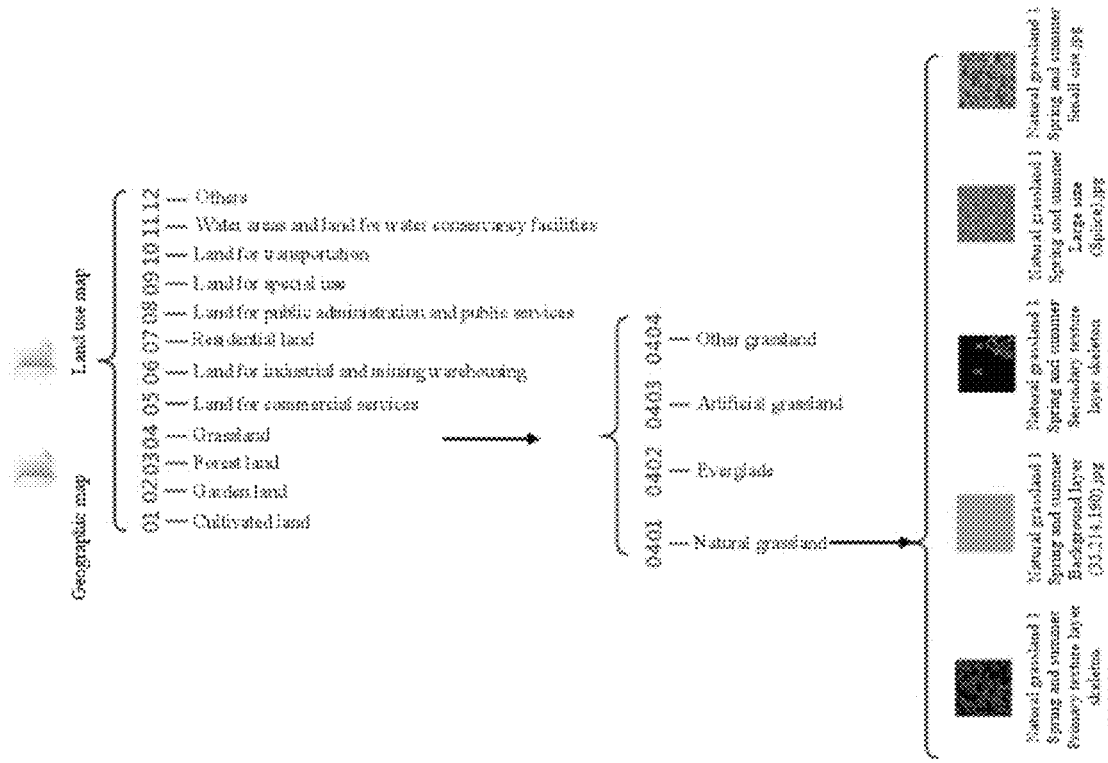
FIG. 14 is a schematic structural diagram of a texture symbol library of land use classification, according to some embodiments of the disclosure.

A structure of the texture library is shown in FIG. 14, where classes are defined according to different thematic map types. There are one or more groups of finished image texture symbols under each second-level class, which are distinguished by "second-level class name" +"numeric sequence number". Next, seasonal characteristics of image or picture sources during making of image texture symbols in the current group are provided. Further, two function classes of different images are provided. One class is image texture symbols that can be directly used for map rendering, such as small-size and large-size stitching and large-size growing in the figure. Splicing and growth are large-scale texture patterns generated by two different methods to eliminate deliberate tiling; the other class is skeleton polygon materials for making image texture symbols. Default color HSV values for making texture symbols are marked after skeleton file names of the primary and secondary texture layers that require coloring so that a user can perform sample image-based texture generation or autonomous coloring again, to obtain area texture symbols of different styles. If the primary texture layer is formed by mixing texture polygons in colors having different shades and belonging to the same color scheme, the skeleton of the primary texture layer may have more than one image.

(7) Examples of Texture Symbols

Figure 15:
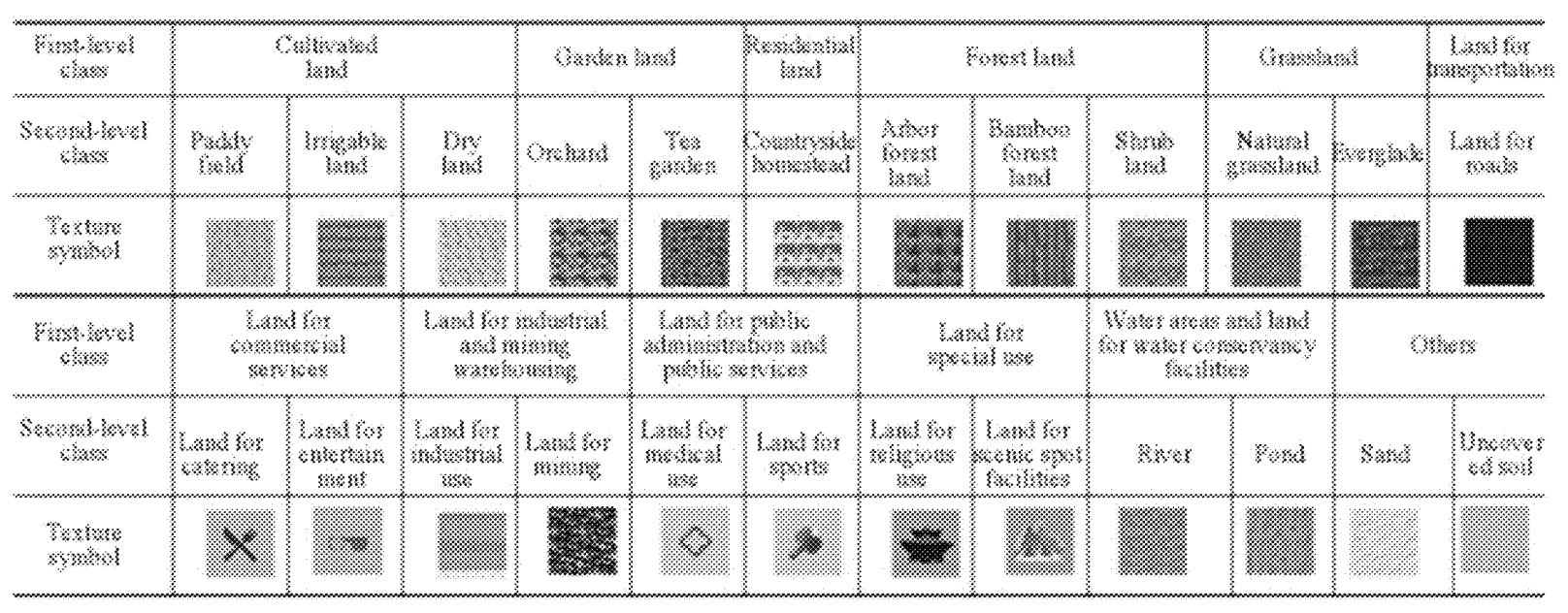

A texture symbol library consists of two parts: natural texture symbols and symbolic texture symbols. Specific examples are as shown in FIG. 15 and FIG. 16.

Figure 17:
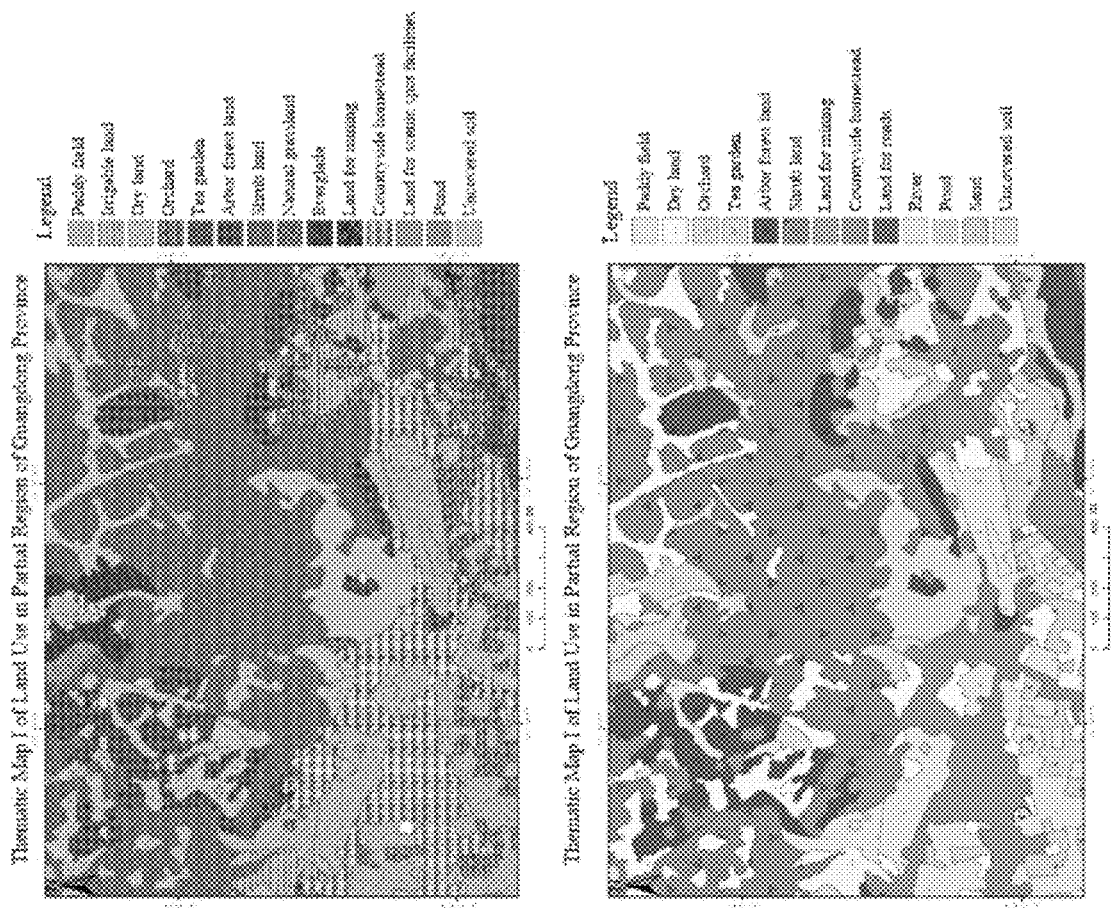
FIG. 17 is a comparison diagram of rendering of texture symbols in the disclosure and rendering of conventional abstract symbols.

A map rendering effect of the disclosure is much better than a filling effect of conventional picture symbols, thus improving the quality and layering of the map. FIG. 17 shows texture symbols rendering of the disclosure (upper figure) and conventional abstract symbol rendering (lower figure).

The natural texture symbols are quantitative map symbols, which can describe practical coverage conditions of land types by changing proportions of primary textures and secondary textures. Moreover, by replacement of a background layer, seasonal changes of land types on the map can be expressed as a whole (as shown in FIG. 18).

According to different purposes of the map, a brightness value V of the texture symbols can be adjusted. It is advised to set V to 160-190 for an indoor wall map, set V to 130-150 for a map for indoor use, and set V to 100-130 for a map for outdoor use, to avoid visual discomfort caused by saturated colors in the current map to map users, and highlight the focus of the current map, namely, the arbor forest land (as shown in FIG. 19).

It will be appreciated by a person of ordinary skill in the art that the embodiments herein are used for helping a reader to understand the implementation method of the disclosure, and it should be understood that the protection scope of the disclosure is not limited to such special statement and embodiments. A person of ordinary skill in the art may make other various specific modifications and combinations according to the technical teachings disclosed in the disclosure without departing from the essence of the disclosure, and such modifications and combinations still fall within the protection scope of the disclosure.

What is claimed is:

1. A method for making texture symbols of a land use classification map, comprising the following steps:
   capturing a plurality of texture materials, wherein the texture materials are captured from at least one of satellite images, real-scene photos, and paintings, wherein the texture materials are classified according to different feature types and different sources of texture materials of the feature types;
   extracting main colors from the plurality of texture materials, wherein the extraction is based on a hue, saturation, value (HSV) color space and comprises:
      creating a first and second dictionary, the first dictionary configured to record color classes and a quantity of color classes, and the second dictionary configured to record an HSV value of each pixel and a color class corresponding to each pixel;
      reading a texture polygon to be processed, and acquiring HSV values pixel by pixel;
      comparing the HSV values with a color component table to determine a color class of a current pixel;
      incrementing a count of the current color class by one and recording the count into the first dictionary, and recording the HSV value and color of the current pixel into the second dictionary; and
      after the processing is finished, acquiring a quantity of color classes of the texture polygon and a quantity of pixels in each different color from the first dictionary;
      obtaining HSV values of all the pixels in each color from the second dictionary; and
      acquiring color values with relatively high frequencies of occurrence through statistics collection;
   clustering the main colors by color scheme, wherein noise in an original image is removed and a quantity of main colors is obtained;
   performing a texture segmentation with a correspondence between the quantity of color clusters and a quantity of texture layers;
   reserving pixels in different main color classes of the texture polygon and setting other pixels to pure black;
   extracting a texture skeleton, wherein after the segmentation, a primary texture layer and a secondary texture layer for forming an image texture symbol are obtained, wherein extracting the texture skeleton comprises removing other noise information and color information, wherein the extracting comprises applying an edge detection algorithm using a Canny operator, a texture skeleton image generated after the edge detection using the Canny operator is a single-channel grayscale image;

converting the single-channel grayscale image to a three-channel image;

adding the obtained texture skeleton to a texture library as a synthesis material of an image texture symbol for use in mapping;

once the skeleton texture is stored into the texture library, adding at least one of a sequence number of the skeleton texture, a season, and a corresponding main color to a file name for query and calling in subsequent use of the texture symbol;

assigning a value of the main color obtained through clustering to a closed region in the texture skeleton to generate the corresponding primary texture layer, and the secondary texture layer is processed in the same manner;

removing a tile effect by at least one of flipping and image stitching and a Wei-Levoy texture synthesis algorithm;

establishing a texture library;

storing texture skeletons and area texture feature symbols for different features in the texture library, wherein a structure of the texture library is classified according to different thematic map types, wherein there are one or more groups of finished image texture symbols under each second-level class, which are distinguished by second-level class name and numeric sequence number, wherein the texture library comprises seasonal characteristics of image or picture sources during making of image texture symbols in the current group, wherein the texture library comprises two function classes of different images, a first class comprising image texture symbols that can be directly used for map rendering and a second class comprising skeleton polygon materials for making image texture symbols; wherein default color HSV values for making texture symbols are marked after skeleton file names of the primary and secondary texture layers that require coloring.

2. The method according to claim 1, wherein in a process of making a non-natural feature texture, image characteristics are extracted from a real-scene photo, and extraction of the main colors is implemented by shrinking an original image, while color clustering is not performed.

3. The method according to claim 1, wherein for a non-natural feature with a symbolic semantic meaning in step, an image of a primary texture layer is obtained through image shrinking and background stripping, and a background layer is made according to stipulations about background layer colors in land class color codes of national land survey.

* * * * *